(12) United States Patent
Aref et al.

(10) Patent No.: US 12,081,273 B2
(45) Date of Patent: Sep. 3, 2024

(54) MITIGATION OF EQUALIZATION-ENHANCED PHASE NOISE IN A COHERENT OPTICAL RECEIVER

(71) Applicant: Nokia Solutions and Networks Oy, Espoo (FI)

(72) Inventors: Vahid Aref, Stuttgart (DE); Fred Buchali, Waiblingen (DE); Stenio Magalhaes Ranzini, Stuttgart (DE)

(73) Assignee: Nokia Solutions and Networks Oy, Espoo (FI)

( * ) Notice: Subject to any disclaimer, the term of this patent is extended or adjusted under 35 U.S.C. 154(b) by 31 days.

(21) Appl. No.: 17/828,566

(22) Filed: May 31, 2022

(65) Prior Publication Data

US 2022/0393771 A1    Dec. 8, 2022

(30) Foreign Application Priority Data

Jun. 1, 2021  (EP) ..................... 21177217

(51) Int. Cl.
*H04B 10/60* (2013.01)
*H04B 10/079* (2013.01)
(Continued)

(52) U.S. Cl.
CPC ..... *H04B 10/614* (2013.01); *H04B 10/07951* (2013.01); *H04B 10/532* (2013.01);
(Continued)

(58) Field of Classification Search
CPC ............ H04B 10/614; H04B 10/07951; H04B 10/532; H04B 10/6165; H04B 10/60; H04B 10/61; H04B 10/616; H04B 10/6161
(Continued)

(56) References Cited

U.S. PATENT DOCUMENTS 7,606,498 B1   10/2009 Wu et al.
7,747,177 B2   6/2010 Chen et al.
(Continued)

FOREIGN PATENT DOCUMENTS

BR    102015030130 A2   6/2017
WO    2016038654 A1    3/2016

OTHER PUBLICATIONS

Xu et al, Analytical Investigations on Carrier Phase Recovery in Dispersion Unmanaged, Sep. 2016, Photonics, All Document. (Year: 2016).*

(Continued)

*Primary Examiner* — Dibson J Sanchez
(74) *Attorney, Agent, or Firm* — Stratford Group Ltd.

(57) ABSTRACT

A coherent optical data receiver having a digital signal processor (DSP) capable of mitigating equalization-enhanced phase noise (EEPN). In an example embodiment, the DSP mitigates EEPN by applying individual phase adjustments to different spectral slices of a digital stream carrying CD-compensated digital samples of the received optical data signal. In different embodiments, the individual phase adjustments can be dynamically selected based on symbol decisions taken prior to EEPN mitigation, based on transmitted pilot symbols, and/or using moving averages computed for different spectral slices. Some embodiments are suitable for handling polarization-division-multiplexed optical data signals. Some embodiments are advantageously capable of producing an effective SNR gain of approximately 1 dB.

20 Claims, 6 Drawing Sheets (51) Int. Cl.
*H04B 10/532* (2013.01)
*H04B 10/61* (2013.01)

(52) U.S. Cl.
CPC .............. *H04B 10/60* (2013.01); *H04B 10/61* (2013.01); *H04B 10/616* (2013.01); *H04B 10/6161* (2013.01); *H04B 10/6165* (2013.01)

(58) Field of Classification Search
USPC .................................................. 398/202–214
See application file for complete search history.

(56) References Cited

U.S. PATENT DOCUMENTS

| | | | | |
|---|---|---|---|---|
| 8,761,609 | B1* | 6/2014 | Agazzi | H04L 7/0075 |
| | | | | 398/208 |
| 8,938,037 | B1* | 1/2015 | Fard | H04L 27/2272 |
| | | | | 375/345 |
| 9,020,364 | B2 | 4/2015 | Xie et al. | |
| 9,025,963 | B2* | 5/2015 | Malouin | H04L 27/2273 |
| | | | | 398/140 |
| 9,071,364 | B1* | 6/2015 | Voois | H04B 10/58 |
| 9,077,455 | B2 | 7/2015 | Randel et al. | |
| 9,191,120 | B2 | 11/2015 | Zhou | |
| 9,584,260 | B2* | 2/2017 | Fludger | H04B 10/614 |
| 9,806,823 | B2 | 10/2017 | Castrillon et al. | |
| 9,847,841 | B1 | 12/2017 | Kaneda | |
| 10,511,388 | B1* | 12/2019 | Vassilieva | H04B 10/516 |
| 10,651,947 | B2* | 5/2020 | Shen | H04B 10/614 |
| 11,108,599 | B1* | 8/2021 | Li | H04L 25/03159 |
| 2008/0152361 | A1* | 6/2008 | Chen | H04B 10/6164 |
| | | | | 398/205 |
| 2012/0106982 | A1* | 5/2012 | Wagner | H04B 10/61 |
| | | | | 398/208 |
| 2012/0213532 | A1* | 8/2012 | Hironishi | H04B 10/6161 |
| | | | | 398/208 |
| 2013/0230312 | A1* | 9/2013 | Randel | H04B 10/612 |
| | | | | 398/25 |
| 2014/0099128 | A1* | 4/2014 | Mateo | H04B 10/6163 |
| | | | | 398/158 |
| 2015/0071630 | A1* | 3/2015 | Oyama | H04B 10/2543 |
| | | | | 398/208 |
| 2016/0197681 | A1* | 7/2016 | Sun | H04B 10/6162 |
| | | | | 398/81 |
| 2016/0204871 | A1* | 7/2016 | Li | H04L 27/2601 |
| | | | | 398/183 |
| 2018/0076903 | A1 | 3/2018 | Oyama et al. | |
| 2018/0091288 | A1* | 3/2018 | Zamani | H04B 10/6166 |
| 2018/0269985 | A1* | 9/2018 | Zhu | H04L 7/0075 |
| 2019/0199443 | A1* | 6/2019 | Zamani | H04B 10/616 |
| 2020/0092146 | A1 | 3/2020 | Nazarathy et al. | |
| 2023/0027345 | A1* | 1/2023 | Gorshtein | H04B 10/614 |

OTHER PUBLICATIONS

Pilori et al, Observing the effect of polarization mode dispersion, Oct. 2019, OSA Continuum, All Document. (Year: 2019).*
Zhou et al, Silicon Photonics for 100Gbaud, Feb. 2021, Journal of Lightwave Technology, All Document. (Year: 2021).*
European Search Report for EP Application No. 21177217 mailed Nov. 17, 2021, 2 pages.
WO 2011/161637 A2, Technion R&D Foundation [IL]; Yissum Res Dev Co [IL] et al., Dec. 29, 2011 (Dec. 29, 2011), paragraphs [0004], [0142], [0285] [0323]; figure 15.
Ramtin Fahoudi et al., "Performance of carrier phase recovery for electronically dispersion compensated coherent systems", Laval University, Nov. 19, 2012, vol. 20, No. 24, Optics Express 26582, 15 pages.
Tianhua Xu, "DSP based Chromatic Dispersion Equalization and Carrier Phase Estimation in High Speed Coherent Optical Transmission Systems", KTH Royal Institute of Technology, Doctoral Thesis in Photonics and Optics Stockholm, Sweden 2012, 82 pages.
Aditya Kakkar et al., "Comprehensive Study of Equalization-Enhanced Phase Noise in Coherent Optical Systems", Journal of Lightwave Technology, vol. 33, No. 23, Dec. 1, 2015, 8 pages, Downloaded May 30, 2022 from IEEE Xplore.

* cited by examiner

MITIGATION OF EQUALIZATION-ENHANCED PHASE NOISE IN A COHERENT OPTICAL RECEIVER

The project leading to this application has received funding from the European Union's Horizon 2020 research and innovation programme under the Marie Skłodowska-Curie grant agreement No 766115.

CROSS REFERENCE TO RELATED APPLICATIONS

This application claims priority to European Patent Application No. EP 21177217.3, filed Jun. 1, 2021, which is hereby incorporated by reference herein in its entirety.

BACKGROUND

Field

Various example embodiments relate to optical communication equipment and, more specifically but not exclusively, to optical receivers.

Description of the Related Art

This section introduces aspects that may help facilitate a better understanding of the disclosure. Accordingly, the statements of this section are to be read in this light and are not to be understood as admissions about what is in the prior art or what is not in the prior art.

Some coherent optical fiber-transmission systems perform electronic compensation of chromatic dispersion (CD) using a digital signal processor (DSP) of the corresponding optical receiver. Electronic CD compensation is typically more cost effective than optical CD compensation. However, unlike the latter, electronic CD compensation at the receiver may cause equalization-enhanced phase noise (EEPN), which can be imparted by the electronic CD compensator onto the CD-compensated electrical signal in the presence of optical-local-oscillator (OLO) phase noise. The signal-to-noise ratio (SNR) penalty associated with EEPN typically increases with increases of the symbol rate, amount of CD, and OLO linewidth. Detrimental effects of EEPN may disadvantageously be relatively more pronounced in the next generation of coherent optical fiber-transmission systems, e.g., employing higher (e.g., >100 GBaud) symbol rates and/or having relatively long dispersion-uncompensated fiber links.

SUMMARY OF SOME SPECIFIC EMBODIMENTS

Disclosed herein are various embodiments of a coherent optical data receiver that may have a DSP capable of mitigating EEPN. In an example embodiment, the DSP mitigates EEPN by applying individual (e.g., different respective) phase adjustments to different spectral slices of a digital stream carrying CD-compensated digital samples of the received optical data signal. In different embodiments, the individual phase adjustments can be dynamically selected based on symbol decision(s) taken prior to some of the EEPN mitigation, based on transmitted pilot symbols, and/or using moving averages computed for different spectral slices. Some embodiments are suitable for handling polarization-division-multiplexed optical data signals. Some embodiments are advantageously capable of producing an effective SNR gain of approximately 1 dB.

According to an example embodiment, provided is an apparatus, comprising: a coherent optical data receiver including an optical hybrid, a plurality of light detectors, a plurality of analog-to-digital converters, and a digital signal processor, the analog-to-digital converters being configured to output streams of digital samples in response to measurements performed by the light detectors on interferences of an optical data signal and an optical local oscillator, the interferences being produced by the optical hybrid; and wherein the digital signal processor comprises a chromatic-dispersion compensator and a phase-noise mitigation circuit, the chromatic-dispersion compensator being configured to adjust said digital samples to compensate for chromatic dispersion of the optical data signal, the phase-noise mitigation circuit being configured to adjust a stream of dispersion-compensated samples by applying individual phase adjustments to different spectral slices thereof.

In some embodiments of the above apparatus, the digital signal processor is configured to select the individual phase adjustments to, at least partially, mitigate phase-noise collectively caused by the chromatic-dispersion compensator and the optical local oscillator.

In some embodiments of any of the above apparatus, the digital signal processor is configured to recover a data stream of the optical data signal from the streams of said digital samples.

In some embodiments of any of the above apparatus, the digital signal processor comprises a carrier-phase-recovery circuit connected between the chromatic-dispersion compensator and the phase-noise mitigation circuit.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Approximate analytical channel models that may be helpful for better understanding certain properties of EEPN are described, e.g., in (1) William Shieh and Keang-Po Ho, "Equalization-enhanced phase noise for coherent-detection systems using electronic digital signal processing," Optics Express, 2008, vol. 16, no. 20, pp. 15718-15727; and (2)

Aditya Kakkar, Jaime Rodrigo Navarro, Richard Schatz, et al., "Comprehensive study of equalization-enhanced phase noise in coherent optical systems,' Journal of Lightwave Technology, 2015, vol. 33, no. 23, pp. 4834-4841, both of which are incorporated herein by reference in their entirety.

Figure 1:
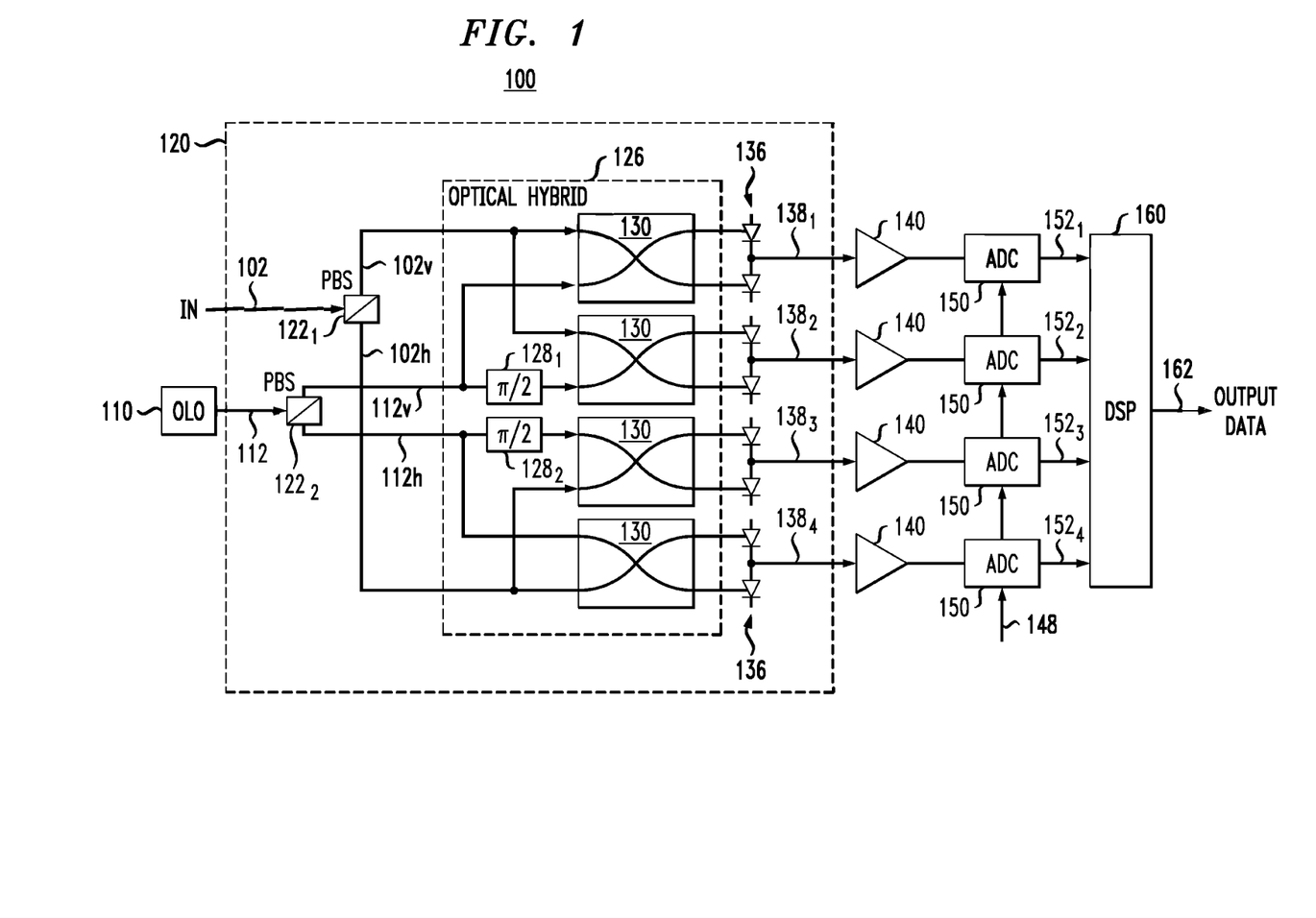
FIG. 1 shows a block diagram of an optical data receiver in which various embodiments may be practiced.

FIG. 1 shows a block diagram of a coherent optical data receiver 100 in which various embodiments may be practiced. Receiver 100 is configured to receive a polarization-division-multiplexed (PDM) optical signal 102, e.g., via an optical fiber, from a remote optical data transmitter (not explicitly shown in FIG. 1). Optical input signal 102 is applied to an optical-to-electrical (O/E) converter 120 configured to convert that optical signal into four corresponding electrical signals $138_1$-$138_4$. Each of electrical signals $138_1$-$138_4$ may optionally be amplified in a corresponding amplifier 140 coupled to a corresponding analog-to-digital converter (ADC) 150. Each ADC 150 samples the output of the corresponding amplifier 140 at an appropriate sampling frequency and sampling phase(s) set by a clock signal 148 to produce a corresponding one of four digital electrical signals $152_1$-$152_4$. Digital electrical signals $152_1$-$152_4$ are then applied to a DSP 160 configured to process these signals, e.g., as described in more detail below in reference to FIG. 2, to recover the data streams originally encoded onto the two polarization components of the optical input signal 102 at the remote optical data transmitter. DSP 160 is further configured to output the recovered data via an electrical data signal 162. In an example embodiment, DSP 160 is an electrical circuit.

Clock signal 148 is typically used to configure ADCs 150 to sample their respective input signals at a sampling rate that causes each ADC to generate a desired number of signal samples per symbol period T, e.g., such that the signal samples have desired sampling phases within the period T. For example, clock signal 148 may have a frequency that is two times higher than the nominal symbol rate of optical input signal 102. In different embodiments, clock signal 148 may or may not be synchronized with the internal clock of the optical signal.

O/E converter 120 implements a polarization-diversity homodyne- or intradyne-detection scheme using an OLO signal 112 generated by a laser 110. In an example embodiment shown in FIG. 1, O/E converter 120 comprises polarization beam splitters (PBSs) $122_1$ and $122_2$ configured to decompose optical signals 102 and 112, respectively, into two respective orthogonally polarized components, illustratively vertically polarized components 102v and 112v and horizontally polarized components 102h and 112h. These polarization components are then applied to an optical hybrid 126 as indicated in FIG. 1. In some embodiments, either of the polarization splitters $122_1$ and $122_2$ may be replaced by an optical intensity splitter, because some coherent-optical-receiver designs may not require that the portions of both the signal light and the OLO light, interfered therewith, have the same polarization in individual ones of optical mixers 130.

Optical hybrid 126 operates to split each of polarization components 102v, 112v, 102h, and 112h into two respective attenuated copies, e.g., using a conventional 3-dB power splitter (not explicitly shown in FIG. 1). A relative phase shift of about 90 degrees ($\pi/2$ radian) is then applied to one copy of component 112v and one copy of component 112h using phase shifters $128_1$ and $128_2$, respectively. The various copies of signals 102v, 112v, 102h, and 112h are optically mixed with each other as indicated in FIG. 1 using a plurality of optical signal mixers 130, and the mixed optical signals produced by the optical signal mixers are detected by eight photodetectors (e.g., photodiodes) 136. Photodetectors 136 are arranged in balanced pairs, e.g., as shown in FIG. 1, and the output of each photodetector pair is a corresponding one of electrical signals $138_1$-$138_4$, which may also be low-pass filtered. This configuration of photodetectors 136 is a differential configuration that helps, e.g., to reduce noise and improve dc balancing.

In an example embodiment, DSP 160 operates to perform: (i) signal equalization; (ii) clock recovery; and (iii) carrier- and data-recovery (CDR) processing. Signal equalization is generally directed at reducing the detrimental effects of various signal impairments imparted by the corresponding transmission channel. Such signal impairments may include, but are not limited to chromatic dispersion (CD), polarization distortion, polarization-mode dispersion, various forms of noise, and optionally some other linear and/or nonlinear forms of signal distortion. Several example embodiments of DSP 160 are described in more detail below in reference to FIGS. 2-7.

Figure 2:
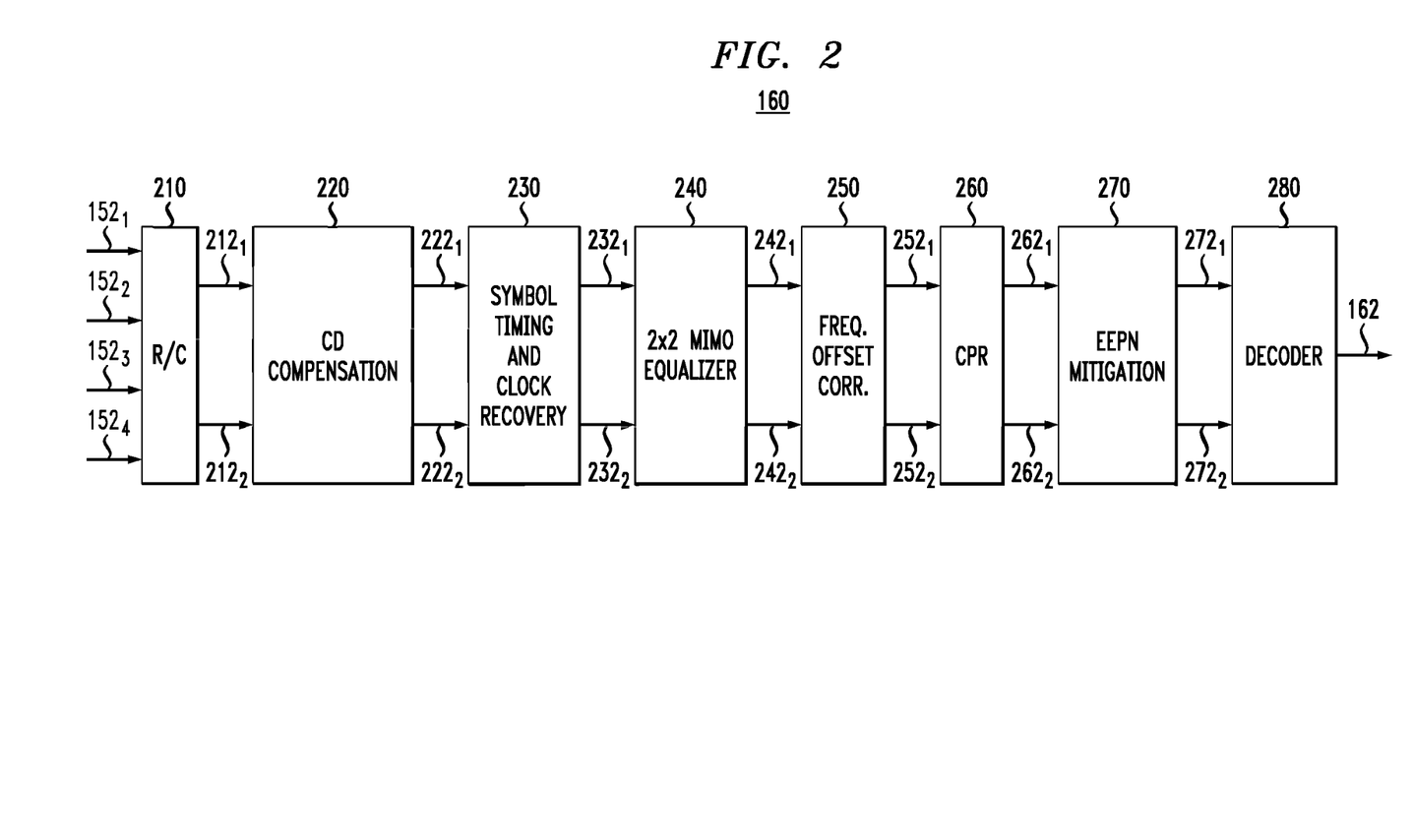
FIG. 2 shows a block diagram of a DSP that can be used in the optical data receiver of FIG. 1 according to an embodiment.

FIG. 2 shows a block diagram of DSP 160 (FIG. 1) according to an embodiment. As already indicated above, DSP 160 is configured to generate the output data signal 162 in response to digital electrical signals $152_1$-$152_4$ received from the front-end circuit of optical data receiver 100 (also see FIG. 1).

In an example embodiment, optical input signal 102 may be data-modulated using a Quadrature Phase Shift Keying (QPSK) constellation, an M-ary Quadrature Amplitude Modulation (M-QAM) constellation (e.g., with M=16, 64, etc.), or another two-dimensional constellation. Ideally, digital signals $152_1$ and $152_2$ approximately represent the I and Q components, respectively, of the first polarization component of optical input signal 102, and digital signals $152_3$ and $152_4$ approximately represent the I and Q components, respectively, of the second (orthogonal) polarization component of the optical input signal. However, optical-link impairments, receiver-implementation imperfections, and configuration inaccuracies generally cause each of digital signals $152_1$-$152_4$ to be a convoluted signal that has various signal distortions and/or contributions from both of the original (e.g., independently modulated) polarization components and/or both I and Q phase components of the transmitted optical data signal. The train of signal processing implemented in DSP 160 is generally directed at reducing the adverse effects of various signal distortions and de-convolving digital signals $152_1$-$152_4$ such that the transmitted data can be properly recovered to generate the output data signal 162.

DSP 160 comprises a real-to-complex (R/C) signal converter 210 configured to convert the four real-valued digital-sample streams provided via digital signals $152_1$-$152_4$ into the corresponding two complex-valued digital-sample streams, which are then directed downstream, along the signal-processing pipeline of the DSP, as digital signals $212_1$ and $212_2$, respectively. In some embodiments, R/C signal converter 210 may also be configured to perform some additional signal processing. For example, signal converter 210 may be configured to perform signal processing directed at reducing signal distortions imposed by the front-end circuit 120/140/150 of optical data receiver 100 (also see FIG. 1). These distortions may be caused, e.g., by incorrect biasing of various electro-optical components in O/E converter 120, imperfect signal splitting in power and polarization splitters and optical couplers, frequency dependence and variability of O/E conversion characteristics of the photo-detectors, deskews among the four ADCs 150, etc. Example signal-processing methods that can be implemented in R/C signal converter 210 for this purpose are disclosed, e.g., in U.S. Pat. No. 9,847,841, which is incorporated herein by reference in its entirety.

Complex-valued digital signals $212_1$ and $212_2$ are applied to a CD compensation (CDC) module 220 for CDC processing therein, and the resulting CDC-processed signals are complex-valued digital signals $222_1$ and $222_2$, respectively. In operation, CDC module 220 is configured, e.g., as known in the pertinent art, to significantly reduce or substantially cancel the detrimental effects of chromatic dispersion caused by the optical link that delivers optical signal 102 from the corresponding source optical data transmitter to optical data receiver 100. In an example embodiment, CDC module 220 may first estimate, e.g., based on digital signals $212_1$ and $212_2$, the group delay in the optical link and then select a suitable configuration of various configurable elements within the CDC module to compensate the estimated group delay.

Digital signals $222_1$ and $222_2$ generated by CDC module 220 are applied to a clock-recovery module 230. Good synchronization between certain digital-sample streams in DSP 160 and the symbol clock used at the corresponding source optical data transmitter is typically needed for correct recovery of the transmitted data. As such, the signal processing implemented in clock-recovery module 230 is often directed at causing at least complex-valued digital signals $232_1$ and $232_2$ to be properly sampled for the subsequent processing in the downstream modules of DSP 160. For example, in some embodiments, clock-recovery module 230 may be configured to generate a control signal for controlling the rate and phase of clock signal 148 applied to ADCs 150 (FIG. 1). In some other embodiments, signal interpolation, re-sampling, and/or other suitable configurations and/or algorithms may be used to implement clock-recovery module 230.

Digital signals $232_1$ and $232_2$ outputted by clock-recovery module 230 are applied to a 2×2 multiple-input/multiple-output (MIMO) equalizer 240 for MIMO-equalization processing therein, and the resulting equalized signals are complex-valued digital signals $242_1$ and $242_2$. In an example embodiment, equalizer 240 may be configured to generate complex-valued digital signals $242_1$ and $242_2$ by mixing complex-valued digital signals $232_1$ and $232_2$ in accordance with Eqs. (1a) and (1b):

$$r_1(k)=h_{11}(k)*x_1(k)+h_{12}(k)*x_2(k) \quad (1a)$$

$$r_2(k)=h_{21}(k)*x_1(k)+h_{22}(k)*x_2(k) \quad (1b)$$

where $r_1(k)$ is a complex value carried by signal $242_1$; $r_2(k)$ is a complex value carried by signal $242_2$; $x_1(k)$ is a string of complex values in signal $232_1$; $x_2(k)$ is a string of complex values in signal $232_2$; k is the time-slot index; the "*" symbol denotes the convolution operation; and $h_{11}$, $h_{12}$, $h_{21}$, and $h_{22}$ are the matrix elements of the transfer function $$H = \begin{pmatrix} h_{11} & h_{12} \\ h_{21} & h_{22} \end{pmatrix}$$

of equalizer 240. In an example embodiment, each of $x_1$, $x_2$, $h_{11}$, $h_{12}$, $h_{21}$, and $h_{22}$ can be a respective finite-length vector of complex values. The vectors $h_{11}$, $h_{12}$, $h_{21}$, and $h_{22}$ typically represent the configurations of the corresponding multi-tap finite-impulse-response (FIR) filters used in equalizer 240.

In an example embodiment, equalizer 240 can be configured to perform at least some of the following functions: (i) electronic polarization demultiplexing and/or rotation; and (ii) digital signal processing directed at reducing the adverse effects of some of the above-indicated signal impairments, such as polarization-mode dispersion, polarization-dependent loss, inter-symbol interference, residual chromatic dispersion, etc. Example digital circuits that can be used to implement equalizer 240 are disclosed, e.g., in U.S. Pat. Nos. 9,077,455 and 9,020,364, both of which are incorporated herein by reference in their entirety.

Digital signals $242_1$ and $242_2$ generated by MIMO equalizer 240 are applied to a frequency-offset-correction (FOC) module 250 configured to implement signal processing directed at compensating for the (usually present) frequency mismatch between the OLO signal 112 and the carrier frequency of optical input signal 102. The resulting frequency-offset-corrected signals are digital signals $252_1$ and $252_2$, respectively. Some signal-processing techniques that can be used to implement such frequency-mismatch compensation in FOC module 250 are disclosed, e.g., in U.S. Pat. No. 7,747,177 and U.S. Patent Application Publication No. 2008/0152361, both of which are incorporated herein by reference in their entirety.

Digital signals $252_1$ and $252_2$ generated by FOC module 250 are applied to a carrier-phase-recovery (CPR) module 260 configured to implement signal processing directed at compensating for phase fluctuations caused by the cumulative phase noise of the transmitter laser and OLO laser 110. Because the linewidth of typical (e.g., semiconductor) lasers used as transmitter and OLO lasers is typically in the range between 100 kHz and 10 MHz, the corresponding phase noise varies much slower than the phase changes in signal 102 associated with the QPSK or M-QAM data modulation. As a result, in an example embodiment, CPR module 260 can be configured to: (i) estimate such relatively slow-varying phase-noise components of digital signals $252_1$ and $252_2$; and (ii) remove the estimated phase-noise components from the digital signals $252_1$ and $252_2$, thereby generating phase-corrected digital signals $262_1$ and $262_2$, respectively. Many signal-processing techniques that can be used in CPR module 260 for this purpose are known to persons of ordinary skill in the pertinent art and are reviewed, e.g., in Kazuro Kikuchi, "Fundamentals of Coherent Optical Fiber Communications," Journal of Lightwave Technology, 2016, vol. 34, no. 1, pp. 157-179, which is incorporated herein by reference in its entirety.

The signal processing implemented in CPR module 260 is often not practically capable of effectively mitigating EEPN. Digital signals $262_1$ and $262_2$ generated by CPR module 260 are therefore applied to an EEPN-mitigation module 270 configured to implement signal processing directed at EEPN-mitigation, e.g., as described in more detail below in reference to FIGS. 3-7. The resulting EEPN-mitigated signals are digital signals $272_1$ and $272_2$, respectively.

Digital signals $272_1$ and $272_2$ generated by EEPN-mitigation module 270 are applied to an electronic decoder 280. Decoder 280 is configured to use the complex values conveyed by digital signals $272_1$ and $272_2$ to appropriately map each received modulation symbol onto the operative constellation (e.g., QPSK or M-QAM) and, based on such mapping, recover the corresponding data. Decoder 280 may then appropriately multiplex the streams of data recovered from digital signals $272_1$ and $272_2$, respectively, to generate the output data signal 162.

In some embodiments, decoder 280 may also be configured to perform digital signal processing that implements error correction based on data redundancies (if any) in optical input signal 102. For example, many forward-errorcorrection (FEC) methods suitable for this purpose are well known to persons of ordinary skill in the pertinent art.

Figure 3:
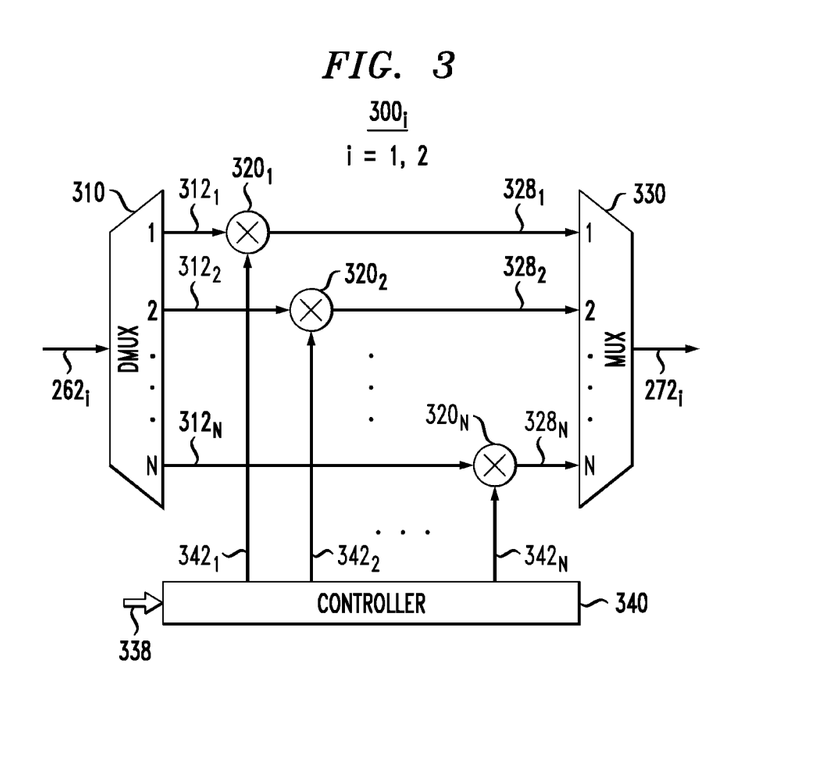
FIG. 3 shows a block diagram of a digital circuit that can be used in the DSP of FIG. 2 according to an embodiment.

FIG. 3 shows a block diagram of a digital circuit $300_i$ that can be used in EEPN-mitigation module 270 according to an embodiment. Circuit $300_i$ operates to generate digital signal $272_i$ in response to digital signal $262_i$, where i=1 or 2 (also see FIG. 2). In an example embodiment, EEPN-mitigation module 270 can be implemented using two instances of digital circuit $300_i$, i.e., digital circuits $300_1$ and $300_2$. In some embodiments, such digital circuits $300_1$ and $300_2$ may share an electronic controller 340. In such embodiments, electronic controller 340 may be configured to generate input signals 342 for multipliers 320 of both digital circuits $300_1$ and $300_2$ in a correlated or interdependent manner, e.g., based on a common set 338 of control signals. In some other embodiments, digital circuits $300_1$ and $300_2$ may have separate electronic controllers 340 configured to independently generate respective sets of input signals 342 for multipliers 320 of digital circuits $300_1$ and $300_2$, e.g., based on different respective sets 338 of control signals.

Digital circuit $300_i$ comprises a digital signal, frequency demultiplexer (DMUX) 310 and a digital signal, frequency multiplexer (MUX) 330. DMUX 310 has one input port and N output ports 1, 2, . . . , N, where N is an integer greater than one. MUX 330 has N input ports 1, 2, . . . , N and one output port. The input port of DMUX 310 is configured to receive digital signal $262_i$. The output port of MUX 330 is configured to output digital signal $272_i$. Each of the N output ports of DMUX 310 is connected to a respective one of the N input ports of MUX 330 by way of a respective one of multipliers $320_1$-$320_N$, as indicated in FIG. 3. In different embodiments, the number N can be any number, e.g., from 2 to 256. In some preferred embodiments, the number N can be in the range from 4 to 16.

Figure 4:
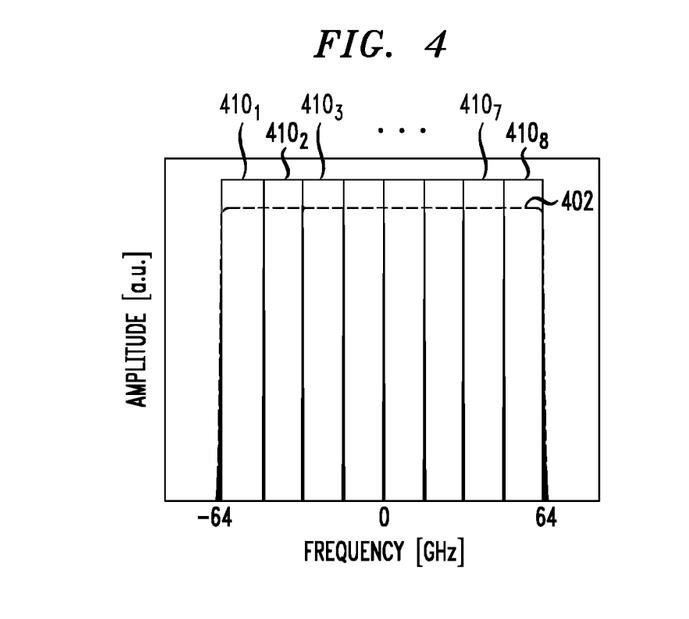
FIG. 4 graphically shows example spectral characteristics of a digital signal slicer that can be used in the digital circuit of FIG. 3 according to an embodiment.

FIG. 4 graphically shows example spectral characteristics of DMUX 310 according to an embodiment. More specifically, the example embodiment of FIG. 4 corresponds to N=8. A dashed curve 402 indicates the spectral envelope of digital signal $262_i$ corresponding to the symbol rate of 128 GBaud. Substantially non-overlapping spectral bands $410_1$-$410_8$ represent the pass-bands of DMUX 310 for the signal paths between the input port thereof and the output ports 1, 2, . . . , 8, respectively (N=8). In an example embodiment, each of spectral bands $410_1$-$410_8$ may have a spectral shape of a raised cosine filter with a zero roll-off factor β, i.e., β=0. In an alternative embodiment, other suitable spectral shapes of the pass-bands may also be used in DMUX 310. Each of the signal paths through DMUX 310 may be implemented using a respective FIR filter, in which case DMUX 310 comprises an array of such FIR filters connected in parallel.

Referring back to FIG. 3, DMUX 310 operates to split digital signal $262_i$ into N spectral portions (slices), labeled as signals $312_1$-$312_N$, respectively, with each of such N portions being outputted at a respective one of the output ports 1, 2, . . . , N of the DMUX. As such, each of digital signals $312_1$-$312_N$ has a spectral content limited to the corresponding pass-band of DMUX 310 (also see FIG. 4). Digital signal $312_n$ is applied to a first input of multiplier $320_n$, where n=1, 2, . . . , N. A second input of multiplier $320_n$ is connected to receive digital signal $342_n$ from electronic controller 340. Multiplier $320_n$ operates to multiply digital signals $312_n$ and $342_n$, thereby generating a corresponding digital signal $328_n$. MUX 330 is connected to receive digital signals $328_1$-$328_N$ at the input ports 1, 2, . . . , N thereof, respectively, and operates to generate digital signal $272_i$ by spectrally combining the received digital signals $328_1$-$328_N$.

Electronic controller 340 operates to generate digital signals $342_1$-$342_N$ based on control signals 338, e.g., as described in more detail below in reference to FIGS. 5 and 6. In an example embodiment, digital signal $342_n$ can be mathematically expressed as a complex exponent $\exp(-j\psi_n(k))$, where $\psi_n(k)$ is the n-th phase adjustment, and k is the time-slot index. Consequently, in the frequency domain, digital signal $272_i$ generated by MUX 330 can be approximated using Eq. (2) as follows:

$$Y(f, k) = \sum_{n=1}^{N} X_n(f, k) \cdot \exp(-j\psi_n(k)) \qquad (2)$$

where f is frequency; Y(f, k) represents digital signal $272_i$ in the k-th time slot; and $X_n$(f, k) represents digital signal $312_n$ in the k-th time slot. Qualitatively, Eq. (2) can be interpreted as representing an application of different relative phase shifts to different spectral slices of the data-bearing signal.

The above-described overall functionality of circuit $300_i$ may be effective for mitigating the detrimental effects of EEPN due to at least some of the following approximate (e.g., qualitative) causative connections. First, it is important to note that the effects of CD and CDC have different impacts on the signal contributions corresponding to the source transmitter laser and the receiver's OLO laser 110. More specifically, the phase noise caused by the transmitter laser is subjected to CD in the dispersive optical fiber and then to CD compensation in CDC module 220. In contrast, the phase noise caused by OLO laser 110 only convolves with the transfer function of CDC module 220, but not with that of the dispersive optical link. Hence, the effect of the above-described CDC processing is that different spectral slices of the receiver's phase noise are subjected to different relative delays in CDC module 220. CPR module 260 operates to compensate only for an average delay, but not for the delay spread, which then causes the corresponding EEPN-induced SNR penalty. The above-described functionality of circuit $300_i$, e.g., as qualitatively represented by Eq. (2), can beneficially be used to significantly reduce the delay spread imposed on different spectral slices of the receiver's phase noise in CDC module 220, thereby significantly reducing the EEPN-induced SNR penalty.

Figure 5:
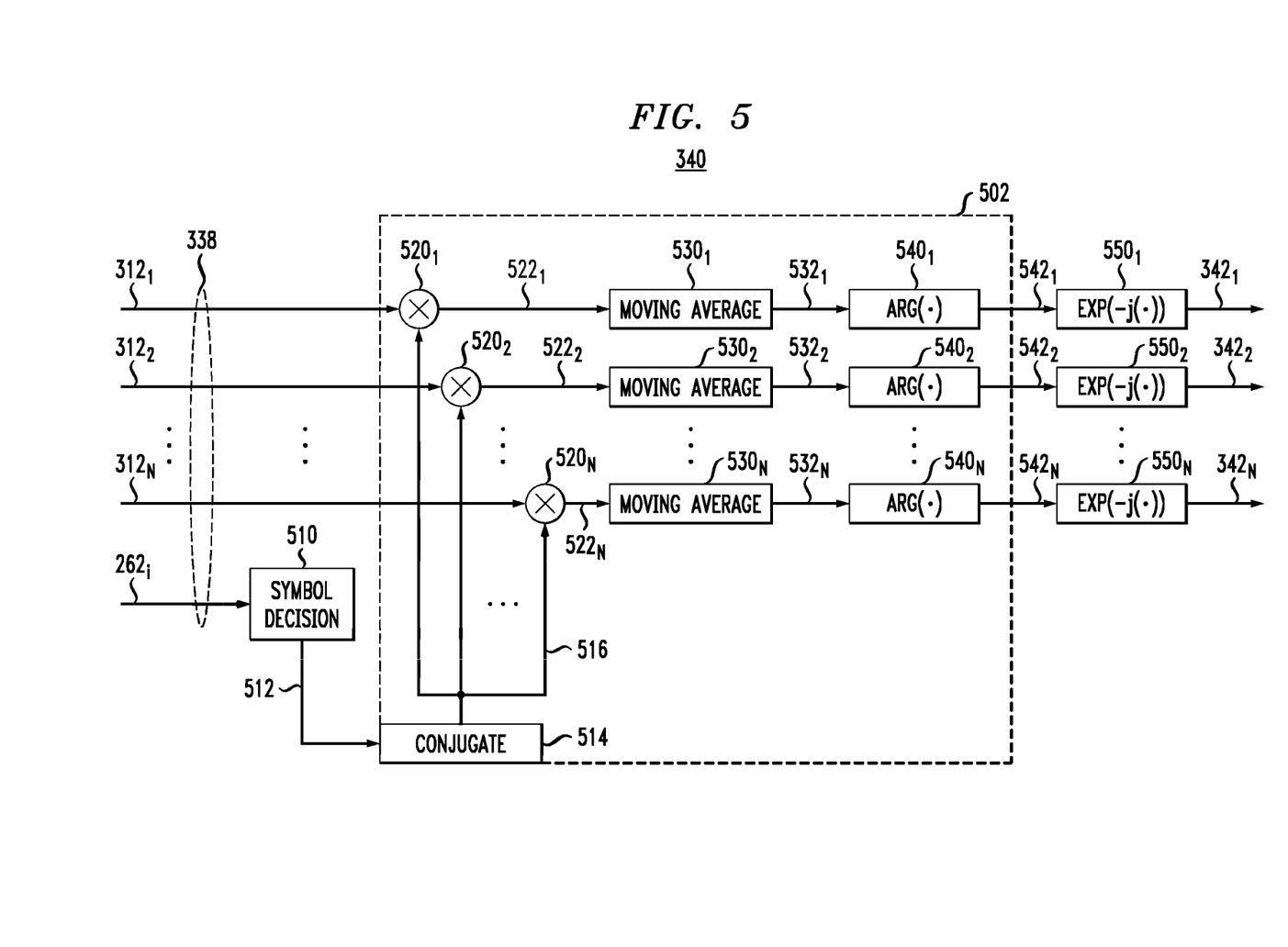
FIG. 5 shows a block diagram of an electronic controller that can be used in the digital circuit of FIG. 3 according to an embodiment.

FIG. 5 shows a block diagram of electronic controller 340 according to an embodiment. In this particular embodiment, the signal set 338 includes digital signals $312_1$-$312_N$ and $262_i$ (also see FIG. 3).

As shown in FIG. 5, controller 340 comprises a decision circuit 510 connected to receive digital signal $262_i$. In operation, decision circuit 510 maps, in a conventional manner, each complex value conveyed by digital signal $262_i$ onto the operative constellation (e.g., QPSK or M-QAM) to determine the corresponding constellation symbol (point). As known in the pertinent art, each constellation symbol of QPSK or M-QAM constellation can be represented by a corresponding complex value (which reflects the coordinates of the constellation point on the complex plane). A digital output signal 512 generated by decision circuit 510 thus carries a stream of such complex values.

Controller 340 further comprises a complex-conjugate circuit 514 and multipliers $520_1$-$520_N$. Complex-conjugate circuit 514 operates to convert each complex value of digital signal 512 into a corresponding complex-conjugate value, thereby generating a digital signal 516. N copies of digital signal 516 are then applied as inputs to multipliers $520_1$-$520_N$, respectively. Each multiplier $520_n$ (where n=1, 2, ..., N) operates to multiply, in each time slot, the corresponding complex values of digital signals $312_n$ and $516$, thereby generating a complex-valued digital signal $522_n$. Digital signal $522_n$ is then converted into digital signal $342_n$ using serially connected digital circuits $530_n$, $540_n$, and $550_n$.

Digital circuit $530_n$ operates to compute a moving average of digital signal $522_n$, thereby generating a corresponding complex-valued digital signal $532_n$. The length of the averaging window used in digital circuit $530_n$ is a selectable parameter, which can be selected, e.g., to optimize the performance of digital circuit $300_i$. In an example embodiment, the length of the averaging window can be, e.g., between 10 and 1000 time slots.

Digital circuit $540_n$ operates to determine the argument of each complex value of digital signal $532_n$, thereby generating real-valued digital signal $542_n$. Thus, in each time slot, digital signal $542_n$ carries the corresponding value of the phase adjustment $\psi_n$. In other words, digital signal $542_n$ is a stream of phase adjustments $\psi_n(k)$ (also see Eq. (2)).

Digital circuit $550_n$ uses digital signal $542_n$ to compute the corresponding complex exponent values $\exp(-j\psi_n(k))$, i.e., related to the estimated phase noise at this stage of the DSP. The resulting stream of such complex exponent values is digital signal $342_n$, which is applied to multiplier $320_n$ as previously explained in reference to FIG. 3.

Figure 6:
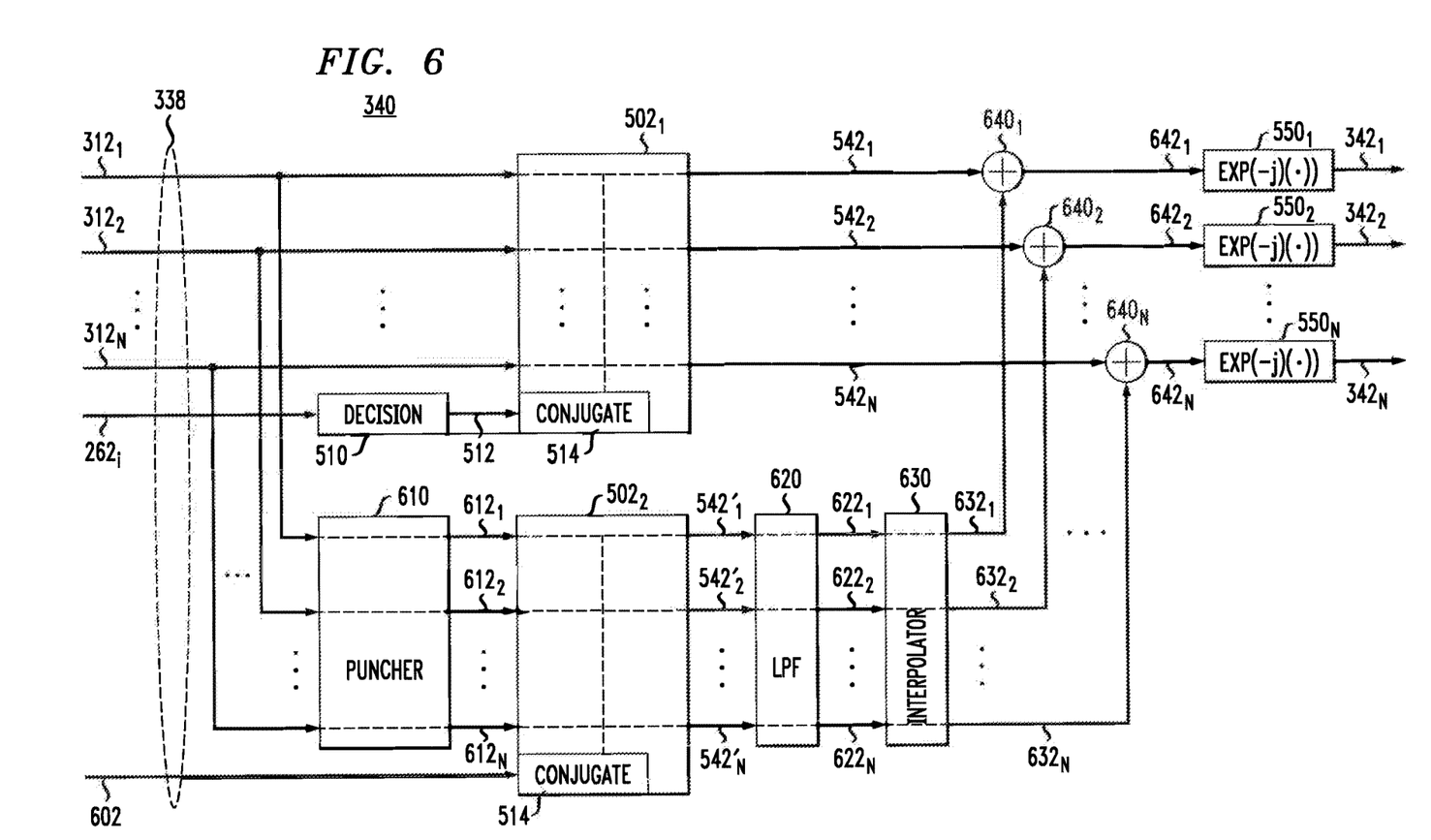
FIG. 6 shows a block diagram of an electronic controller that can be used in the digital circuit of FIG. 3 according to another embodiment.

FIG. 6 shows a block diagram of electronic controller 340 according to another embodiment. In this particular embodiment, the signal set 338 includes a pilot-symbol sequence 602 in addition to the digital signals $312_1$-$312_N$ and $262_i$ used in the embodiment of FIG. 5 (also see FIG. 3).

Herein, the term "pilot symbol" refers to a constellation symbol known a priori both to the corresponding remote data transmitter and to optical data receiver 100. In an example embodiment, the optical data transmitter may uniformly or non-uniformly distribute pilot symbols among the payload symbols. For example, in a system configuration employing 1% of pilot symbols, e.g., a pilot symbol can be transmitted after ninety-nine payload symbols. In a system configuration employing 2% of pilot symbols, e.g., a pilot symbol can be transmitted after forty-nine payload symbols. In a system configuration employing 10% of pilot symbols, a pilot symbol can be transmitted, e.g., after nine payload symbols, etc. Herein, the term "payload symbol" refers to a constellation symbol that is not known a priori to optical data receiver 100 and needs to be determined therein using measurements of the received optical data signal 102 and processor-implemented decoding of such measurements. Payload symbols typically form the part of a data packet that is and/or carries an intended message from the corresponding data transmitter to the data receiver.

A sufficiently long pilot-symbol sequence may be constructed, e.g., by quasi-randomly selecting constellation symbols from the operative constellation such that different parts of the constellation are appropriately and sufficiently sampled therein. Copies of the pilot-symbol sequence so constructed can then be pre-loaded into the respective memories of the corresponding optical data transmitter and optical data receiver 100. During data transmission, the optical data transmitter can insert, symbol-wise, the pilot-symbol sequence fetched from the memory into the transmitted symbol stream such that two neighboring pilot symbols therein are separated by a fixed number of payload symbols, e.g., by ninety-nine, forty-nine, or nine payload symbols, as in the above-mentioned examples. A suitable control-plane protocol can be used to make optical data receiver 100 aware of how the pilot symbols of the sequence are inserted into the transmitted symbol stream by the corresponding optical data transmitter so that DSP 160 can properly invoke the receiver's copy of the pilot-symbol sequence during the signal processing therein.

The embodiment of electronic controller 340 shown in FIG. 6 comprises two instances of a digital circuit 502, which are labeled $502_1$ and $502_2$, respectively. Circuit elements included in each of digital circuits $502_1$ and $502_2$ can be seen inside the dashed-line box 502 in FIG. 5. More specifically, digital circuit 502 comprises N pass-through paths, with the n-th pass-through path including serially connected circuit elements $520_n$, $530_n$, and $540_n$ described above in reference to FIG. 5, where n=1, 2, ..., N. Complex-conjugate circuit 514 is configured to operate as an input port of digital circuit 502 and the output of the complex-conjugate circuit is connected to each of the N pass-through paths using the multipliers $520_1$-$520_N$ as shown in FIG. 5. Dotted lines shown inside each of the blocks $502_1$ and $502_2$ in FIG. 6 simplistically indicate the N pass-through paths and their connections to the respective complex-conjugate circuit 514 for added clarity of depiction.

Digital circuit $502_1$ is connected to receive the same inputs and generate the same outputs as digital circuit 502 in the embodiment of FIG. 5. More specifically, the inputs to digital circuit $502_1$ are digital signals $312_1$-$312_N$ and 512. The outputs generated by digital circuit $502_1$ are digital signals $542_1$-$542_N$ (also see FIG. 5).

Digital circuit $502_2$ is clocked at a lower rate than digital circuit $502_1$ and its inputs are different from those of digital circuit $502_1$. More specifically, the N pass-through paths of digital circuit $502_2$ are connected to receive digital signals $612_1$-$612_N$, respectively. Digital signals $612_1$-$612_N$ are produced by a punching circuit 610 configured to let through only the digital samples of digital signals $312_1$-$312_N$ corresponding to the pilot symbols. In other words, punching circuit 610 drops (discards) the digital samples of digital signals $312_1$-$312_N$ corresponding to the payload symbols. Complex-conjugate circuit 514 of digital circuit $502_2$ is connected to receive, from the memory of DSP 160, the receiver's copy of the used pilot-symbol sequence 602. Digital signals 602 and $612_1$-$612_N$ are all clocked at the same rate, which is lower than the clock rate of digital signals $312_1$-$312_N$. The output signals generated by digital circuit $502_2$ in response to digital signals 602 and $612_1$-$612_N$ are labeled in FIG. 6 using the reference numerals $542_1'$-$542_N'$.

Electronic controller 340 of FIG. 6 further comprises a low-pass filter (LPF) 620, an interpolator 630, adders $640_1$-$640_N$, and digital circuits $550_1$-$550_N$.

LPF 620 operates to subject each of digital signals $542_1'$-$542_N'$ generated by digital circuit $502_2$ to low-pass filtering, thereby generating digital signals $622_1$-$622_N$, respectively. Interpolator 630 operates to interpolate each of digital signals $622_1$-$622_N$ and resample each of the interpolated signals at a higher rate to generate digital signals $632_1$-$632_N$. In an example embodiment, the cut-off frequency of LPF 620 can be about 5 GHz, and the clock rate of digital signals $632_1$-$632_N$ can be the same as the clock rate of digital signals $542_1$-$542_N$ generated by digital circuit $502_1$. In alternative embodiments, other values of the cut-off frequency of LPF 620 can be selected, e.g., based on the pilot-symbol percentage, symbol rate, etc.

Adder $640_n$ operates to sum, in each clock cycle, the digital values applied thereto by digital signals $542_n$ and $632_n$, thereby generating a corresponding digital signal $642_n$. Digital circuit $550_n$ then uses digital signal $642_n$ to compute the corresponding complex exponent values as previously explained in reference to FIG. 5. The resulting stream of such complex exponent values is digital signal $342_n$, which is applied to multiplier $320_n$ as previously explained in reference to FIG. 3.

Digital signal $542_n$ generated by digital circuit $502_1$ carries phase adjustment values $\varphi_n(k)$ computed for the n-th spectral slice based on symbol decisions taken by decision circuit 510. Digital signal $632_n$ generated by digital circuit $502_2$, LPF 620, and interpolator 630 carries phase adjustment values $\theta_n(k)$ computed for the n-th spectral slice based on a priori knowledge of the transmitted pilot symbols by the receiver. Digital signal $642_n$ thus carries phase adjustment values $\psi_n(k)$ (also see Eq. (2)) computed as:

$$\psi_n(k)=\varphi_n(k)+\theta_n(k) \quad (3)$$

The use of pilot symbols in the determination of phase adjustments for the different spectral slices may be particularly beneficial in the presence of relatively strong bursts of EEPN. During such a burst, the phase adjustment values $\varphi_n(k)$ may only capture the differential values of the "true" phase adjustments needed for nearly optimal cancellation of EEPN because a EEPN burst typically causes the corresponding burst of erroneous decisions 512. However, due to the use of pilot symbols and low-pass filtering, the phase adjustment values $\theta_n(k)$ can typically provide a good estimate of the (slow-varying) common component of such "true" phase adjustments during such bursts. As a result, computation of the phase adjustments in accordance with Eq. (3) may provide higher SNR gains than the use of $\varphi_n(k)$ alone in certain deployment scenarios. An optical-network operator may therefore choose to rely on the relative cost-benefit analysis of the embodiments of FIGS. 5 and 6 to select one or the other, e.g., because the potentially higher SNR gains of the embodiment of FIG. 6 come at a cost of higher DSP and system complexities.

Figure 7:
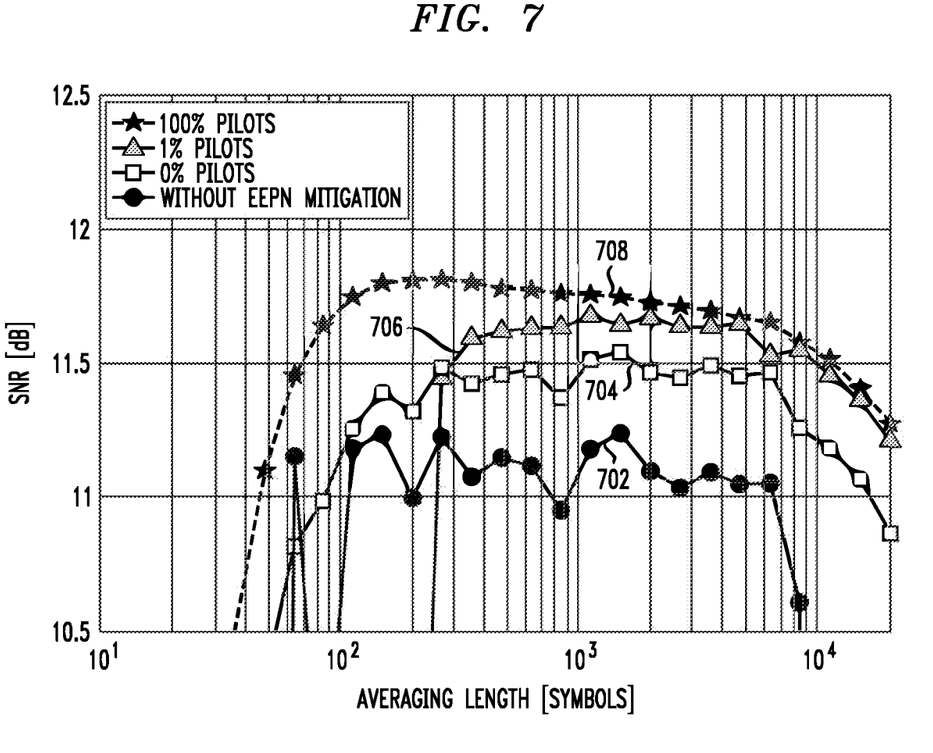
FIG. 7 graphically illustrates example performance improvements that may possibly be realized in the optical data receiver of FIG. 1 according to some embodiments.

FIG. 7 graphically illustrates example performance improvements that the inventors believe may possibly be realized in optical data receiver 100 according to some embodiments. The SNR data shown in FIG. 7 were obtained using computer simulations, in which the following system parameters were used: (i) symbol rate of 128 GBaud; (ii) optical SNR of 22 dB; (iii) run time corresponding to the transmission of $2^{19}$ 16-QAM symbols; (iv) transmitter pulse shaping with a root-raised cosine filter, $\beta=0.01$; (v) fiber length of 5000 km; (vi) CD parameter of 20.16 ps/nm/km; (vii) OLO linewidth of 100 kHz; (viii) ADC rate of 2 samples per symbol; (ix) the number of slices N=8; and (x) each pass-band of DMUX 310 being implemented using a 128-tap FIR filter configured to have a raised cosine spectral shape with $\beta=0$. The abscissa in FIG. 7 represents the averaging length of the CPR algorithm employed in CPR module 260 and/or of the EEPN algorithm employed in EEPN-mitigation module 270. The ordinate in FIG. 7 represents the effective SNR of optical data receiver 100.

A curve 702 graphically illustrates estimated SNR characteristics of an example of optical data receiver 100 when EEPN-mitigation module 270 is bypassed. A curve 708 graphically illustrates estimated SNR characteristics of optical data receiver 100 when the transmitted symbol sequence has only pilot symbols, i.e., all transmitted symbols are a priori known to the receiver. A person of ordinary skill in the art will understand that curve 708 approximates the theoretical performance limit of optical data receiver 100 under the above-specified conditions. A curve 704 graphically illustrates estimated SNR characteristics of optical data receiver 100, wherein EEPN-mitigation module 270 employs the electronic controller 340 of FIG. 5. A curve 706 graphically illustrates estimated SNR characteristics of optical data receiver 100, wherein EEPN-mitigation module 270 employs the electronic controller 340 of FIG. 6, and the transmitted symbol sequence has 1% of pilot symbols. Comparison of curves 704 and 706 with curve 702 reveals the approximate magnitude of practical SNR improvements that may be expected for some examples of an optical data receiver 100 employing EEPN-mitigation module 270 in the DSP pipeline thereof, e.g., as described in this specification.

According to an example embodiment disclosed above, e.g., in the summary section and/or in reference to any one or any combination of some or all of FIGS. 1-7, provided is an apparatus comprising: a coherent optical data receiver (e.g., 100, FIG. 1) including an optical hybrid (e.g., 126, FIG. 1), a plurality of light detectors (e.g., 136, FIG. 1), a plurality of analog-to-digital converters (e.g., 150, FIG. 1), and a digital signal processor (e.g., 160, FIG. 1), the analog-to-digital converters being configured to output streams of digital samples in response to measurements performed by the light detectors on interferences of an optical data signal (e.g., 102, FIG. 1) and an optical local oscillator (e.g., 112, FIG. 1), the interferences being produced by the optical hybrid; and wherein the digital signal processor comprises a chromatic-dispersion compensator (e.g., 220, FIG. 2) and a phase-noise mitigation circuit (e.g., 270, FIG. 2), the chromatic-dispersion compensator being configured to adjust said digital samples to compensate for chromatic dispersion of the optical data signal, the phase-noise mitigation circuit being configured to adjust a stream of dispersion-compensated samples (e.g., $262_i$, FIGS. 2, 3) by applying individual phase adjustments (e.g., $342_1$-$342_N$, FIG. 3) to different spectral slices (e.g., $312_1$-$312_N$, FIG. 3) thereof.

In some embodiments of the above apparatus, the digital signal processor is configured to select the individual phase adjustments to, at least partially, mitigate phase-noise collectively caused by the chromatic-dispersion compensator and the optical local oscillator.

In some embodiments of any of the above apparatus, the digital signal processor is configured to recover a data stream (e.g., 162, FIG. 1) of the optical data signal from the streams of said digital samples.

In some embodiments of any of the above apparatus, the digital signal processor comprises a carrier-phase-recovery circuit (e.g., 260, FIG. 2) connected between the chromatic-dispersion compensator and the phase-noise mitigation circuit.

In some embodiments of any of the above apparatus, the phase-noise mitigation circuit is configured to select the individual phase adjustments based on symbol decisions (e.g., 510, FIG. 5) taken on the dispersion-compensated samples.

In some embodiments of any of the above apparatus, the phase-noise mitigation circuit is further configured to select the individual phase adjustments based on pilot symbols (e.g., 602, FIG. 6) of the optical data signal.

In some embodiments of any of the above apparatus, the phase-noise mitigation circuit is further configured to select the individual phase adjustments using moving averages (e.g., $530_1$-$530_N$, FIG. 5) computed for different ones of the different spectral slices.

In some embodiments of any of the above apparatus, the phase-noise mitigation circuit is capable of selecting the individual phase adjustments based on the pilot symbols with less than 10% (or less than 2%) of data symbols in the optical data signal being pilot symbols.

In some embodiments of any of the above apparatus, the phase-noise mitigation circuit is capable of selecting the individual phase adjustments based on the pilot symbols with individual ones of the pilot symbols in the optical data signal being separated from one another by sets of payload symbols.

In some embodiments of any of the above apparatus, the digital signal processor comprises an electronic polarization rotator (e.g., 240, FIG. 2) connected between the chromatic-dispersion compensator and the phase-noise mitigation circuit; and wherein the phase-noise mitigation circuit comprises first and second digital circuits (e.g., $300_1$, $300_2$, FIG. 3) configured to separately apply respective subsets of the individual phase adjustments to the dispersion-compensated samples corresponding to first and second orthogonal polarizations of the optical data signal.

In some embodiments of any of the above apparatus, the different spectral slices include at least four (or at least eight) spectral slices (e.g., N=4 or 8, FIG. 3).

In some embodiments of any of the above apparatus, the apparatus further comprises an optical data transmitter configured to apply the optical data signal to the optical data receiver 100 through an end section of at least 100 km of dispersion-uncompensated optical fiber.

In some embodiments of any of the above apparatus, the optical data signal has a symbol rate of at least 100 GBaud.

In some embodiments of any of the above apparatus, the optical data signal may have a symbol rate smaller than 100 GBaud, e.g., 10 GBaud, 25 GBaud, or 50 GBaud.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments may be implemented as circuit-based processes, including possible implementation on a single integrated circuit.

Some embodiments can be embodied in the form of methods and apparatuses for practicing those methods. Some embodiments can also be embodied in the form of program code recorded in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer or a DSP-based device, the machine becomes an apparatus for practicing the patented invention(s). Some embodiments can also be embodied in the form of program code, for example, stored in a non-transitory machine-readable storage medium including being loaded into and/or executed by a machine, wherein, when the program code is loaded into and executed by a machine, such as a computer or a processor, the machine becomes an apparatus for practicing the patented invention(s). When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

"SUMMARY OF SOME SPECIFIC EMBODIMENTS" in this specification is intended to introduce some example embodiments, with additional embodiments being described in "DETAILED DESCRIPTION" and/or in reference to one or more drawings. "SUMMARY OF SOME SPECIFIC EMBODIMENTS" is not intended to identify essential elements or features of the claimed subject matter, nor is it intended to limit the scope of the claimed subject matter.

What is claimed is:

1. An apparatus, comprising:
a coherent optical data receiver including an optical hybrid, a plurality of light detectors, a plurality of analog-to-digital converters, and a digital signal processor, the analog-to-digital converters being configured to output streams of digital samples in response to measurements performed by the light detectors on interferences of an optical data signal and an optical local oscillator, the interferences being produced by the optical hybrid; and
wherein the digital signal processor comprises a chromatic-dispersion compensator and a phase-noise mitigation circuit, the chromatic-dispersion compensator being configured to adjust said digital samples to compensate for chromatic dispersion of the optical data signal, the phase-noise mitigation circuit comprising a signal spectrum slicer downstream of the chromatic-dispersion compensator and being configured to adjust a stream of dispersion-compensated samples by applying individual phase adjustments to different spectral slices of the stream of dispersion-compensated samples.

2. The apparatus of claim 1, wherein the digital signal processor is configured to select the individual phase adjustments to, at least partially, mitigate phase-noise caused by the chromatic-dispersion compensator.

3. The apparatus of claim 2, wherein the digital signal processor is configured to recover a data stream of the optical data signal from the streams of said digital samples.

4. The apparatus of claim 2, wherein the digital signal processor comprises a carrier-phase-recovery circuit connected between the chromatic-dispersion compensator and the phase-noise mitigation circuit.

5. The apparatus of claim 2, wherein the phase-noise mitigation circuit is configured to select the individual phase adjustments based on symbol decisions taken on the dispersion-compensated samples.

6. The apparatus of claim 2, wherein the phase-noise mitigation circuit is configured to select the individual phase adjustments based on pilot symbols of the optical data signal.

7. The apparatus of claim 2, wherein the phase-noise mitigation circuit is configured to select the individual phase adjustments using moving averages computed for different ones of the different spectral slices.

8. The apparatus of claim 1, wherein the digital signal processor is configured to recover a data stream of the optical data signal from the streams of said digital samples.

9. The apparatus of claim 1, wherein the digital signal processor comprises a carrier-phase-recovery circuit connected between the chromatic-dispersion compensator and the phase-noise mitigation circuit.

10. The apparatus of claim 1, wherein the phase-noise mitigation circuit is configured to select the individual phase adjustments based on symbol decisions taken on the dispersion-compensated samples.

11. The apparatus of claim 10, wherein the phase-noise mitigation circuit is further configured to select the individual phase adjustments based on pilot symbols of the optical data signal.

12. The apparatus of claim 10, wherein the phase-noise mitigation circuit is further configured to select the individual phase adjustments using moving averages computed for different ones of the different spectral slices.

13. The apparatus of claim 1, wherein the phase-noise mitigation circuit is configured to select the individual phase adjustments based on pilot symbols of the optical data signal.

14. The apparatus of claim 13, wherein the phase-noise mitigation circuit is capable of selecting the individual phase adjustments based on the pilot symbols with less than 10% of data symbols in the optical data signal being pilot symbols.

15. The apparatus of claim 13, wherein the phase-noise mitigation circuit is capable of selecting the individual phase adjustments based on the pilot symbols with individual ones of the pilot symbols in the optical data signal being separated from one another by sets of payload symbols.

16. The apparatus of claim 1, wherein the phase-noise mitigation circuit is configured to select the individual phase adjustments using moving averages computed for different ones of the different spectral slices.

17. The apparatus of claim 1,
wherein the digital signal processor comprises an electronic polarization rotator connected between the chromatic-dispersion compensator and the phase-noise mitigation circuit; and
wherein the phase-noise mitigation circuit comprises first and second digital circuits configured to separately apply respective subsets of the individual phase adjustments to the dispersion-compensated samples corresponding to first and second orthogonal polarizations of the optical data signal.

18. The apparatus of claim 1, wherein the different spectral slices include at least four spectral slices.

19. The apparatus of claim 1, further comprising an optical data transmitter configured to apply the optical data signal to the optical data receiver through an end section of at least 100 km of dispersion-uncompensated optical fiber.

20. The apparatus of claim 1, wherein the optical data signal has a symbol rate of at least 100 GBaud.

* * * * *